Nov. 29, 1966 T. E. McMURRAY ETAL 3,287,997
SLUG RETAINING PIPE TAP
Filed Feb. 25, 1964
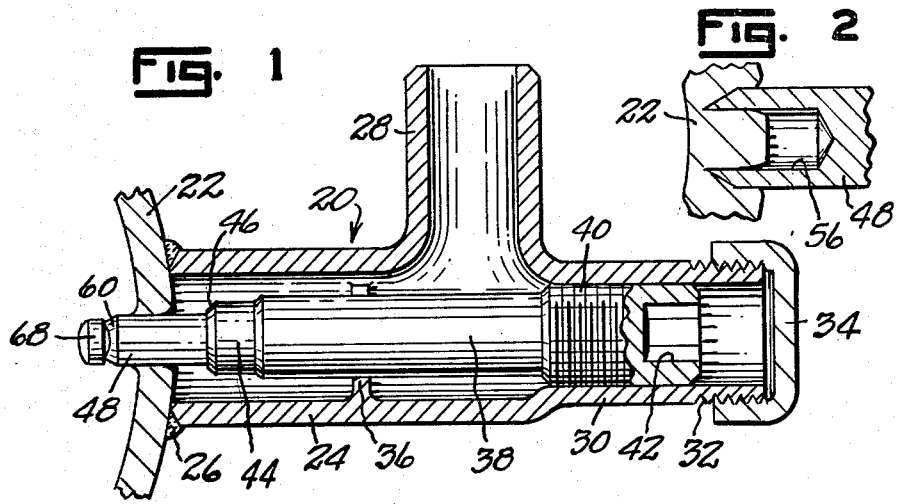
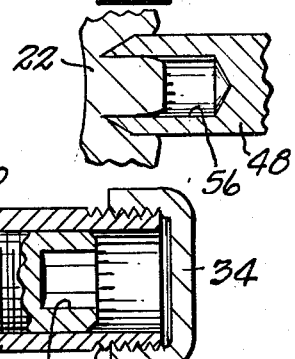
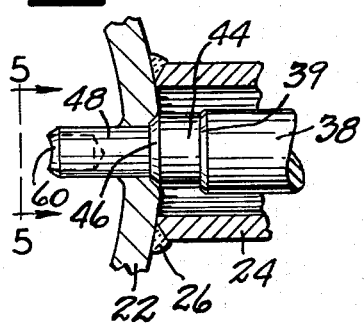
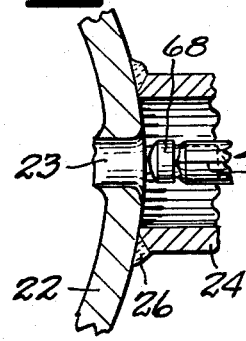
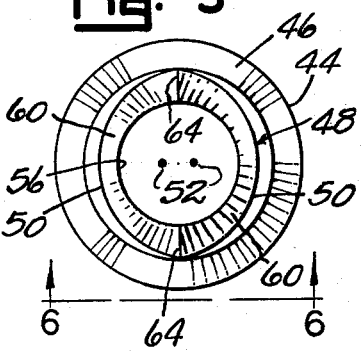
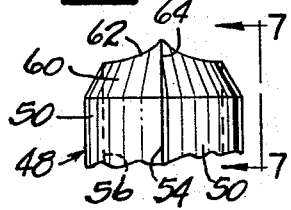
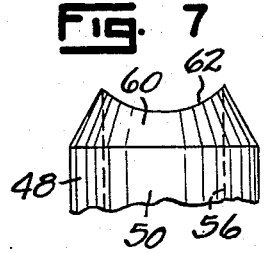
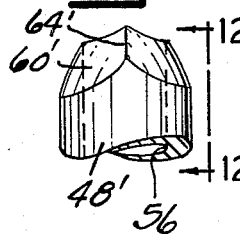
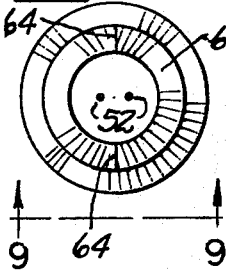
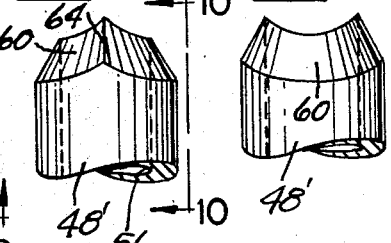
EUGENE C. KNOBLOCK
THOMAS E. McMURRAY
INVENTORS.
BY
Eugene L. Knoblock
ATTORNEY

United States Patent Office 3,287,997
Patented Nov. 29, 1966

3,287,997
SLUG RETAINING PIPE TAP
Thomas E. McMurray and Eugene C. Knoblock, South Bend, Ind., assignors to M. B. Skinner Company, a division of Textron, Inc., South Bend, Ind., a corporation of Rhode Island
Filed Feb. 25, 1964, Ser. No. 347,151
6 Claims. (Cl. 77—42)

This invention relates to a slug retaining pipe tap, and more particularly to a tap for use in a T fitting, such as is employed commonly in the gas industry and other industries for tapping a main or a vessel containing liquid under pressure for the purpose of withdrawing such fluid through a branch line connected to the T fitting.

This device is an improvement upon the device shown in Merrill et al. Patent No. 2,950,673, dated August 30, 1960, and Merrill et al. Patent No. 2,990,731, dated July 4, 1961.

Prior devices of this character have provided inexpensive, efficient, convenient, easily used means, such as a tap in a pipe fitting, for forming an aperture in a pipe or other fluid-containing steel member to which the fitting is connected by rotatively advancing a screw-threaded punch type member to form an opening in the steel wall of the fluid-containing member by a swedging action, which produced a slug or coupon. Such slug or coupon is discharged within the fluid container or main which has been tapped and is retained therein. Such slugs are usually of such mass and comparatively small dimension that they do not substantially interfere with the flow of gas or other fluid through the main past the branch fitting or flow of gas or other fluid from the main through the tapped opening into T fitting and the branch line connected thereto. Some users would prefer avoidance of deposit of such a slug or coupon into a pipe main, but heretofore substantial problems have existed, rendering difficult retention of the coupon or slug by the punch or tapping member which formed it.

It is the primary object of this invention to provide a tapping member capable of perforating a steel part by screw-threaded advance thereagainst and serving to form an opening by a swedging operation, displacing a slug or coupon, and then retaining that slug or coupon after separation from the part from which it is taken, so that the slug may be withdrawn from the tapped part to a retracted position where it will not interfere with fluid flow in the member which has been perforated, or fluid flow from that member to a branch connected with the T fitting in which the tapping member is mounted.

A further object is to provide a tapping tool capable of screw-threaded advance for tapping a steel member, which tool is characterized by a working portion or tip of non-circular external cross-sectional shape and of tapered form externally, and with a recess therein of greater depth than the thickness of the member to be tapped, and capable of receiving and confining a portion of a slug or coupon produced by a swedging action of the tool tip upon the work piece.

Other objects will be apparent from the following specification.

In the drawing:

FIG. 1 is a view of our improved pipe tapping device mounted in a T fitting secured to a pipe main with the tool illustrated in position at the completion of a tapping or hole forming operation;

FIG. 2 is a fragmentary enlarged axial sectional view of the tip portion of the tapping tool, positioned intermediate the thickness of a member to be tapped during a tapping operation;

FIG. 3 is a fragmentary sectional view illustrating the use of the tapping member as a valve to seal an opening which has been formed thereby previously in a work piece, such as a pipe main;

FIG. 4 is a fragmentary view of a pipe main T fitting and the tip portion of a tapping tool, illustrating the manner in which the tapping tool retains and carries with it a slug or coupon formed thereby, so that the slug may be withdrawn to a retracted position;

FIG. 5 is an enlarged end view as seen in the direction of the arrows 5—5 of FIG. 3, illustrating one embodiment of the invention;

FIG. 6 is a fragmentary side view of the tip portion of a tapping tool as viewed in the direction of the arrows 6—6 in FIG. 5;

FIG. 7 is a fragmentary side elevation view, illustrating the tip portions of the tool as viewed at right angles to FIG. 6, and in the direction of the arrows 7—7 of FIG. 6;

FIG. 8 is an end view of a modified embodiment of the invention;

FIG. 9 is a fragmentary side view of the tip of a tapping tool as viewed in the direction of the arrows 9—9 in FIG. 8;

FIG. 10 is a fragmentary side view of the tip portion of a tapping tool at right angles to the view shown in FIG. 9 and taken in the direction of the arrows 10—10 of FIG. 9;

FIG. 11 is a fragmentary side view of the tip portion of another modified embodiment of the invention; and FIG. 12 is a fragmentary side view taken in the direction of the arrows 12—12 of FIG. 11.

Referring to the drawing, and particularly to FIGS. 1 to 7 thereof which illustrate one embodiment of the invention, the numeral 20 designates a T fitting which is adapted to be secured to a pipe main 22 or other steel member containing gas or other fluid under pressure. The T fitting may have a tubular part 24 with one end abutted against the member 22 and preferably sealed as by welding thereof at 26. The T fitting has a lateral tubular portion 28 intermediate its length and communicating therewith and adapted for connection by welding or by any other suitable means well understood in the pipefitter's art, with a branch line (not shown). The end portion 30 of the cross tube 24 of the T fitting is internally screw-threaded from its free or open end to the part 28 and preferably has a smaller diameter or bore than the remainder thereof. Part 30 may be externally screw-threaded at 32 at its outer end to mount a screw-threaded cap 34 thereon. If desired, one or more guide lugs 36 may be provided within the T part 24 to serve as guides.

The tapping member preferably has an elongated shank portion 38 of a diameter less than the diameter of the bores of the parts 24 and 30, and one end portion 40 of this shank is of enlarged diameter and externally screw-threaded to mesh with screw-threads (not shown) within the part 30 so as to permit axial advance of the tool upon rotation. A non-circular socket 42, such as a hexagonal socket, is formed in the part 40 at its outer end. The shank 38 may be stepped and in the form shown in FIGS. 1 and 3, may be provided with a portion 44 of substantially cylindrical configuration concentric with but of smaller diameter than the shank part 38. A frusto conical shoulder 46 is formed at the leading end of the shank part 44 and a reduced dimension tip portion 48 projects from tool part 44 coaxially therewith.

The tool tip portion 48 is preferably characterized by a non-circular cross-sectional configuration of uniform character for the major part of its length and preferably defined by a pair of semi-cylindrical surfaces 50 whose respective centers 52 are displaced from the axis of the tool oppositely and preferably equally, as seen in FIG. 5. The resulting exterior configuration is generaly oval but is characterized by a pair of diametrically opposed longitudinal ridges 54 extending along the lines of greatest cross-sectional dimension of the tool tip portion 48. The tip portion 48 has an axial bore 56 formed therein. By virtue of the cross-sectional shape of the tool tip portion it will be apparent that it is generally tubular but varies in wall thickness from a maximum thickness at the areas adjacent the ridges 54 to a minimum thickness midway between the ridges 54, as best seen in FIG. 5. The depth of the bore 56 will preferably be greater than the thickness of the member to be pierced, such as the main 22, and preferably will be of a depth in the order of from one and one-quarter times such thickness of the wall to be pierced to twice the thickness of the wall to be pierced.

The leading end of the tip portion is characterized by a pair of frusto conical tapered or beveled surfaces 60 whose axes are substantially parallel to but displaced from the axis of the tool and which preferably coincide with the axes 52 of the surfaces 50 of the tip portion 48. Inasmuch as the wall thickness of the tip portion varies, the resulting leading edge 62 defined at the junction of the surfaces 60 and of the bore 56 is curved. Also as a result of the shape of the surfaces 62, the bevel leading end portion of the tool tip has opposed ridges 64 converging towards its free end.

The angle of taper or bevel of surfaces 60 relative to the axis of the tool may be from 25 degrees or less to approximately 65 degrees. We prefer that this angle shall be from 30 degrees to 65 degrees to the axis of the tool. We have found that angles which materially exceed 65 degrees displacement from the axis of the tool tend to increase the torque required to utilize the tool and also are of less efficiency as far as coupon retention is concerned.

Insofar as the eccentricity of the axes of the beveled faces 60 and the part-cylindrical surfaces 50 of the tool tip with respect to the axis of a the tool is concerned, such eccentricity preferably extends from approximately one sixty-fourth of an inch to three sixty-fourths of an inch. This produces a difference in the diameter of the portion 48 of the tool of from one thirty-second of an inch to three thirty-seconds of an inch as between the minimum and maximum cross-sectional dimensions. Minimum wall thickness occurs at the narrowest part. The dimensions above quoted are particularly applicable to tools intended to form an opening of one-half inch in diameter. Tools intended to produce openings of other sizes may have eccentricity dimensions substantially proportional to those quoted above. In each instance the diameter of the bore will be correlated with the amount of eccentricity so as to produce a wall thickness of the tubular part of the tool tip portion 48 to assure requisite strength of the tool.

In the use of the device, assuming that the T 20 has been welded or otherwise secured upon the steel member 22 which is to be tapped, as by welding or by the use of a saddle clamp or any other means well known in the art, and assuming further that the branch line has been welded or joined in any other suitable manner to the part 28 of the T fitting, and further assuming that the cap 34 has been removed, the device is ready for use. The tapping tool is introduced into the T with its beveled piercing end foremost and its trailing portion 40 is screw-threaded in the part 30 of the T until the end of the beveled tip is brought to bear against the part 22. Thereafter, continued rotation of the tool will axially advance the tool, forcing the beveled edge against the steel member 22 and will progressively swedge the member 22 by forming an annular groove therein, as illustrated in FIG. 2. As this action takes place, the metal in advance of the tool is displaced to some extent, while a cylindrical portion is formed from the work piece and enters the axial bore 56 of the tool. Rotation of the tool continues until an opening is formed extending completely through the part 22, as shown at 23 in FIG. 4. During the tapping or piercing operation, contact between the beveled surfaces 60 and the work will be limited to a narrow area adjacent each of the ridges 64, and the remainder of the beveled surfaces will be free and clear of the work piece, that is, free and clear of the bottom of the annular groove being formed, as illustrated in FIG. 2. At the same time, the diameter of the opening being formed is determined by the ridges 64 and 54 which occur at the maximum cross-sectional dimension of the tool, and this contact will be a narrow area of contact adjacent each of said ridges 54 and 64 so that the remaining portions of the surfaces 50 and 60 are clear of the work piece. The stud which enters the bore of the tool being cylindrical serves to center the free end of the tool after the formation of the bore has commenced.

In cases where the angles of taper or bevel are in the ranges specified above, and the eccentricity of the surfaces is of the order specified above, minimum resistance to the perforating operation is encountered and minimum torque is therefore required to be exerted by an operator as through a hand tool, such as a wrench. The provision of the ribs is also important by reason of the fact that they minimize friction resistance to the tapping operation.

Prior to the tapping operation a thick non-corrosive grease or lubricant is applied to the tip portion of the tool. A dry form lubricant may be used and applied either by dipping or spraying and is concentrated at the tapered tip edge, although lubricant is preferably provided along the ridged portions 54 of the shank. One lubricant which has been found suitable constitutes a molybdenum disulphide suspended in a volatile material. Other lubricants which are suitable entail a carrier of the synthetic resin type which may have suspended therein minute particles or flakes of copper, lead or indium.

One characteristic of the device which is particularly important is that the leading end of the tool is subject to distortion incident to the tapping operation. The action is one in which the tip is constricted transversely between the ridges 64 of the tip. The tool is expanded transversely at the part of its tip which is of minor dimension, i.e., at which it has clearance with the work during the operation as mentioned above. We have found that the distortion which may result can be as much as .015 inch in some cases. This distortion results in change of the configuration of the tool bore 56 at its mouth from a true cylindrical configuration to a slightly oval configuration. This distortion results in the effective gripping of a slug or coupon by the tool, as illustrated at 68 in FIGS. 1 and 4. The slug or coupon which is formed is generally of mushroom like character and its small shank portion within the bore is firmly gripped. The outer diameter of the head portion of the slug is usually in the order of the minor diameter of the tip portion 48 of the tool, so that, if the tool is advanced after the coupon has been released to the extent necessary to insure that the hole 23 has a uniform diameter throughout its length, the large or head portion of the coupon will have clearance in the hole 23 so that it may be withdrawn through the hole 23 without interference or without dislodgement from the tool as the tool is moved from the position shown in FIG. 1 to the position shown in FIG. 4. In this way retention of the slug or coupon is assured and the tool may be withdrawn to an extent to insure that fluid may flow through the opening 23, past the retained coupon 68, and around the tool shank to the tubular part 28 of the T fitting at which the branch pipe is connected.

In the embodiment of the invention illustrated in FIGS. 8, 9 and 10, the construction of the leading end or tip portion of the tool is similar to that described above and illustrated in FIGS. 1 to 7, inclusive, with the exception that the portion 48' at the tip of the tool is cylindrical externally and has a coaxial cylindrical bore. The beveled surfaces 60 are conical sections formed with reference to the axes 52 eccentric of the axis of the tool, as previously described, so that opposed ridges 64 are provided in substantially diametrically opposed relation to constitute the work-engaging portions of the tip, as explained previously. A construction of the character shown in FIGS. 8, 9 and 10 has been found to be subject to sufficient distortion incident to the tapping operation to insure that the slug or coupon 68 formed thereby is retained by the tool after it is freed from the work piece. The large portion of this slug is smaller than the diameter of the external surface of the tip portion 48', so that after the tool has formed a continuous opening 23 of uniform diameter, the slug, while still carried by the tool, may be withdrawn through the opening 23 as previously explained.

The embodiment of the invention illustrated in FIGS. 11 and 12 discloses a cylindrical tool tip portion 48' similar to that utilized in FIGS. 8, 9 and 10, and a pair of beveled tip surfaces 60' which are eccentric of the axis of the tool but which are curved longitudinally as well as circumferentially. The eccentricity of the surfaces 60' provide a pair of opposed ridges 64' which are curved rather than straight as in the form shown in FIGS. 1 to 7, inclusive, and in FIGS. 8 to 10, inclusive. A tool of the character shown in FIGS. 11 and 12 is also effective to form an opening in a steel member by a swedging action to produce a mushroom-shaped coupon. The tool of FIGS. 11 and 12 is also capable of gripping or retaining the coupon after it is freed from the work piece, so that the same advantages in usage as expressed above can be achieved by using it. The degree of bevel at the surfaces 60' and the degree of eccentricity of the axes of the surfaces 60' relative to the axis of the tool is preferably of the same order as expressed above.

While the preferred embodiments of the invention have been illustrated and described, it will be understood that changes in the construction may be made within the scope of the appended claims without departing from the spirit of the invention.

We claim:

1. A member adapted to be screw-threaded in a T fitting connected to a steel walled fluid-containing member to be tapped and to a discharge conduit, comprising
    an elongated steel member having a screw-threaded end portion, and a punching end portion of smaller cross-sectional dimension than said threaded end portion,
    said punching end portion having a bore open at its end, coaxial with said punch and of an axial dimension greater than the thickness of the wall to be tapped,
    the tip of said punching end portion being defined by at least two surface portions convergent toward the axis of said bore on all radii and of curved shape on all planes transverse of the axis of said punch, each of said converging surface portions having a longitudinal axis offset from the axis of said bore, and each converging surface intersecting a similar surface portion to form longitudinally forwardly converging ridges extending from the outer surface to near the bore of said punching end portion.

2. A member as defined in claim 1, wherein said converging tip defining surfaces are part conical with their respective axes spaced from and substantially parallel to the axes of said member.

3. A member as defined in claim 1, wherein said converging tip defining surface portions are curved longitudinally thereto.

4. A member as defined in claim 1, wherein said tip defining converging surfaces are tapered at angles between 25 degrees and 65 degrees to the axis of said member.

5. A member as defined in claim 1, wherein said punching end portion is tubular with an elliptical outer cross section whereby the wall of said tube differs in thickness on different radii thereof, said wall thickness being greatest adjacent said tip ridges.

6. A member as defined in claim 1, wherein said punching end portion has an exterior defined by two part-cylindrical surface areas whose respective axes are spaced from and parallel to the axis of said member, said punching end portion having longitudinal ridges between said part-cylindrical surface areas and adjacent to the ridges of said tip.

References Cited by the Examiner
UNITED STATES PATENTS

| | | | |
|---|---|---|---|
| 2,990,731 | 7/1961 | Merrill et al. | 77—37 |
| 3,142,205 | 7/1964 | Hulslander | 77—38 |

FRANCIS S. HUSAR, *Primary Examiner.*